(12) United States Patent
Menozzi

(10) Patent No.: US 11,396,159 B2
(45) Date of Patent: Jul. 26, 2022

(54) LOFTY FIBROUS TRIM PART

(71) Applicant: Autoneum Management AG, Winterthur (CH)

(72) Inventor: Edoardo Menozzi, Neuenhof (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 248 days.

(21) Appl. No.: 16/609,192

(22) PCT Filed: Apr. 25, 2018

(86) PCT No.: PCT/EP2018/060523
§ 371 (c)(1),
(2) Date: Oct. 28, 2019

(87) PCT Pub. No.: WO2018/202484
PCT Pub. Date: Nov. 8, 2018

(65) Prior Publication Data
US 2020/0139667 A1    May 7, 2020

(30) Foreign Application Priority Data
May 2, 2017   (EP) .................... 17169095

(51) Int. Cl.
*B32B 5/26*     (2006.01)
*D04H 1/541*    (2012.01)
(Continued)

(52) U.S. Cl.
CPC ............... *B32B 5/26* (2013.01); *B32B 5/18* (2013.01); *B60R 13/02* (2013.01); *D04H 1/5412* (2020.05);
(Continued)

(58) Field of Classification Search
CPC ..... B32B 5/26; B32B 5/18; B32B 2262/0215; B32B 2307/718; D04H 1/541; D04H 1/55; D10F 8/14; B60R 13/02
See application file for complete search history.

(56) References Cited

U.S. PATENT DOCUMENTS 3,193,516 A    7/1965 Nicol
5,225,263 A    7/1993 Baravian
(Continued)

FOREIGN PATENT DOCUMENTS

EP    0900290 A1    3/1999
EP    2939828 A1    11/2015
EP    2939881 A1    11/2015

OTHER PUBLICATIONS

International Search Report from parent PCT/EP2018/060523. dated Nov. 8, 2018.
(Continued)

*Primary Examiner* — Jeremy R Pierce
(74) *Attorney, Agent, or Firm* — FisherBroyles, LLP; Craig W. Mueller

(57) ABSTRACT

Trim part for a vehicle, comprising at least a fibrous layer comprising of thermoplastic bicomponent filaments or staple fibers, consisting of a first polymer forming the sheath of the bicomponent filament or staple fiber and a second polymer forming the core of the bicomponent filament or staple fiber and whereby the fibrous layer is consolidated by heating thereby melting the sheath polymer forming binding points between the filaments or staple fibers, characterized in that at least the sheath of the bicomponent filament or staple fiber comprises a shrinkage reducing additive being at least a polysiloxane, preferably a polydimethylsiloxane.

19 Claims, 1 Drawing Sheet

(51) Int. Cl.
*B60R 13/02* (2006.01)
*B32B 5/18* (2006.01)
*D04H 1/55* (2012.01)
*D01F 8/14* (2006.01)

(52) U.S. Cl.
CPC ........ *D04H 1/55* (2013.01); *B32B 2262/0215* (2013.01); *B32B 2307/718* (2013.01); *D01F 8/14* (2013.01)

(56) References Cited

U.S. PATENT DOCUMENTS

| | | | | |
|---|---|---|---|---|
| 5,300,167 | A * | 4/1994 | Nohr | D04H 1/4291 156/167 |
| 5,613,988 | A * | 3/1997 | Spiegler | B01D 19/0409 44/320 |
| 5,665,803 | A * | 9/1997 | Nohr | D04H 1/4291 524/267 |
| 2007/0042662 | A1* | 2/2007 | Noelle | D04H 3/011 442/327 |
| 2007/0232178 | A1* | 10/2007 | Polat | D04H 1/435 442/414 |
| 2008/0121461 | A1* | 5/2008 | Gross | D04H 1/43828 181/286 |

OTHER PUBLICATIONS

Written Opinion from parent PCT/EP2018/060523. dated Nov. 8, 2018.

* cited by examiner

LOFTY FIBROUS TRIM PART

CROSS REFERENCE TO RELATED APPLICATIONS

This application is a national stage application under 35 U.S.C. 371 and claims the benefit of PCT Application No. PCT/EP2018/060523 having an international filing date of Apr. 25, 2018, which designated the United States, which PCT application claimed the benefit of European Patent Application No. 17169095.1, filed May 2, 2017, the disclosure of each of which are incorporated herein by reference.

TECHNICAL FIELD

The present invention is directed to a vehicle trim part, particularly a trim part for the interior of a vehicle like a cladding or panel, or for the exterior of a vehicle like an under engine shield, an under body panel or an outer wheel arch liner and a method of producing it.

BACKGROUND ART

It is known in the art to produce trim parts for vehicles from fibrous material. For instance it is known to produce an under body panel for shielding the vehicle bottom plate underneath. The use of such an under body panel increases the aerodynamic properties of the car and protects the vehicle bottom from damages due to stone chipping and or other harsh conditions while driving the vehicle on the road. Also other types of panels or cladding like hush panels, closing the gap underneath the dashboard, trunk cladding or parcel shelves might be produced from moulded fibrous felt material.

As a fibrous solution a felt material made of a carded, cross lapped filament material might be used. For instance a polyester based material bonded with Co-polyester. Automotive trim parts may be hot or cold moulded to form the final required shape.

Polyester filaments or fibers normally melt at a temperature of between 110 and 260° C. At a lower temperature however polyester starts softening; in particularly it might start losing its resilience. The loose fibrous structure obtained during forming of the web or mat is beneficial for the acoustic performance of the final part produced. However during the moulding process, the fibrous material may start softening, causing the fibrous structure of the web to collapses in itself, increasing the density and causing less open space within the structure. Thereby reducing the noise absorbing properties of the final trim part produced. This can be seen as thickness shrinkage—an unintentional reduction of the thickness, in particularly during moulding of the part.

This effect is further enhanced by the use of recycled polyester, which may have a lower softening temperature and in addition is less predictable in its overall softening when different sources of materials are mixed. Increasing the effects of thickness shrinkage.

It is therefore the goal of the current invention to enhance the noise absorbing properties of a moulded fibrous trim part for a vehicle, in particular an exterior trim part like a moulded under body panel, outer wheel arch liner or an interior trim part like a cladding or a panel.

SUMMARY OF INVENTION

The object is achieved by the trim part or cladding for a vehicle according to claim 1 or the equivalent solution according to claim 2.

In particularly by a trim part for a vehicle, comprising at least a fibrous layer comprising of thermoplastic bicomponent filaments or staple fibers, consisting of a first polymer forming the core of the bicomponent filament or staple fiber and a second polymer forming the sheath of the bicomponent filament or staple fiber and whereby the fibrous layer is consolidated by heating thereby melting the sheath polymer forming binding points between the filaments or staple fibers, characterized in that the sheath of the bicomponent filament or staple fibre comprises at least a shrinkage reducing additive being a polysiloxane or polydimethylsiloxane.

Or by the alternative solution according to claim 2 in particularly by a trim part for a vehicle, comprising at least a fibrous layer comprising of thermoplastic staple fibers with at least a first group of staple fibers and a second group of staple fibers, whereby the second group of staple fibers has a melting temperature that is higher than the melting temperature of the first group of staple fibers and whereby the fibrous layer is consolidated by heating thereby melting the first group of staple fibers forming binding points between the staple fibers of the second group and whereby at least the first group of staple fibers comprising at least a shrinkage reducing additive being a polysiloxane or polydimethylsiloxane.

Surprisingly, the addition of the additive to the binding polymer reduces the thickness shrinkage of the felt material during the production process of the part including the moulding, resulting in an increase of the loftiness of the final moulded part. Although the material may be heated at least above the softening point of the core material of the bicomponent filaments or staple fibers or the second group of staple fibers with the higher melting temperature, the fibrous structure does not collapse in the same magnitude during the forming of the part. Therefore the original open spaces in the web are substantially preserved as well as the initial height of the web or mat used in the final part. This surprising effect enhances the design freedom. The material is now able to span larger ranges of thicknesses at same or similar area weight while keeping similar noise absorbing properties in the final moulded part at comparable densities.

Due to the addition of polysiloxane in the sheath of the bicomponent material or in the group of mono component staple fibers used as a binder, it is possible to use polyester of both virgin and/or recycled sources, and or combinations of such sources, like for instance recycled polyester coming from bottle flakes, textile or industrial sources, preferably recycled PET (rPET). Surprisingly, the polysiloxane additive even helps overcome the negative effects of the degraded quality of the recycled polyester by boosting the resilience during moulding, reducing the thickness shrinkage.

At least the binder polymer either in the form of the sheath in the bicomponent filament or staple fibers or in the form of binder fibers comprise the polysiloxane additive according to the invention. The binder polymer melts and forms the binding points between the staple fibers of the second fiber group or of the core material of the bicomponent filaments or staple fibers thereby consolidating the fibrous layer.

The Polysiloxane used is at least added to the binder polymer before forming the bicomponent or mono component filament or staple fiber.

Preferably a polysiloxane, with a molecular weight ($M_n$) of at least 5000 Dalton, preferably between 10.000-30.000 Dalton and most preferably between 10.000-20.000 Dalton, and a dispersity index greater than 2 is used.

Preferably the polysiloxane used has a silicon content by weight between 10 and 30%, preferably between 15 and 25%.

Preferably a polysiloxane of the formula according to FIG. 3, whereby R1 and R2 can be any type of alkyl or aryl units linear, cyclic or branched and whereby it is not mandatory that R1 is equal to R2. The end group of the polymer chains may also be alkyl ($CH_3$) or Alkoxy (OH) or amino units ($NH_2$). R1 and R2 may be a $CH_3$ unit forming a preferred Polydimethylsiloxane.

Examples of preferred polysiloxane additives, also known as silicone resins, are polydimethylsiloxane, polydimethylsiloxane, amine-modified polydimethylsiloxane, and epoxy-modified polydimethylsiloxane.

Preferably the polysiloxane is between 0.05 and 1% by weight (wt %) of the consolidated fibrous layer, preferably between 0.09 and 0.5% by weight (wt %), more preferably between 0.09 and 0.35% by weight (wt %).

The core of the bicomponent filaments or the second group of staple fibers with the higher melting point in the alternative solution may contain in addition polysiloxane, preferably between 0 and 2% by weight.

The dispersity index $D_M$, in the past also known as the poly-dispersity index (PDI), measures the ratio of the volume average diameter to the number average diameter. Thus a dispersity index of 1.00 indicates that all particles are of identical size i.e., are mono disperse. Preferably the polysiloxane used has dispersity index greater than 2. Preferably a dispersity index between 2 and 6 is used. Most preferably between 2 and 3.

In a first embodiment the fibrous layer comprises of thermoplastic bicomponent filaments or staple fibers, consisting of a first polymer forming the core of the bicomponent filament or staple fiber and a second polymer forming the sheath of the bicomponent filament or bicomponent staple fiber and whereby the fibrous layer is consolidated by heating thereby melting the sheath polymer forming binding points between the filaments. Preferably the core and the sheath of the bicomponent filament or staple fiber is polyester based, preferably poly ethylene terephthalate (PET) or poly butylene terephthalate (PBT).

Bicomponent filaments might be cut into staple fibers to form the fibrous layer with staple fibers rather than with endless filaments.

Preferably the thermoplastic material forming the core of the bicomponent filaments or staple fibers has a melting temperature that is higher than the melting temperature of the thermoplastic material forming the sheath. Preferably the polysiloxane is added to at least the sheath to obtain the advantageous results. In particularly as the sheath is melting during the moulding of the trim part forming thereby binding points between the filaments or staple fibers and at the same time rearranging the polysiloxane in the sheath material. On the other hand the core preferably is not melting at all and might only slightly soften depending on the softening temperature of the core material used. Surprisingly, even when using rPET resources of polyester with a larger range of softening temperatures the positive effect on the reduction of the thickness shrinkage might be observed.

The polysiloxane additive is preferably added to the sheath polymer forming material before melt spinning the filament or fiber.

Preferably the sheath is made of a copolymer of polyester, preferably a copolymer of poly ethylene terephthalate (PET) or poly butylene terephthalate (PBT), or a glyco or acid modified polyester For instance polyester, preferably a copolymer of polyethylene-terephthalate is mixed with a polysiloxane as disclosed before as part of the master batch of the sheath material used for melt spinning the bicomponent filaments of the core-sheath type.

Preferably the polysiloxane is added in the form of pellets based on a carrier material to increase the miscibility. The list of carrier materials can preferably include but is not limited to one of polycarbonate, polyester or polyolefin. Then, the mixture is subjected to melt-spinning and drawing together with the core material to form a bicomponent using the processes as known in the art for producing bicomponent filaments or staple fibers.

Preferably the consolidated fibrous layer further comprises additional monofilament staple fibres or filaments mixed in with the bicomponent filaments or staple fibers containing the polysiloxane. At least 20% of the staple fibers or filaments are bicomponent comprising the polysiloxane additive in the sheath. Preferably at least 20% of the staple fibers are mono component, preferably at least 70%.

Preferably all bicomponent filaments or fibers are containing the polysiloxane in at least the sheath. The advantage of 100% bicomponent material including the additive according to the invention throughout the mat is the full amount of binding points, giving rise to a consolidated moulded part that can be used as a structural part with a high stiffness.

In an alternative embodiment the bicomponent filament or staple fibers can be replaced by mixing mono component fibers. The sheath polymer of the bicomponent filament or staple fibers of the first embodiment can be replaced with a first group of mono component staple fibers or filaments with a low melting point. While the core polymer of the bicomponent staple fibers or filaments can be replaced with a second group of mono component staple fibers or filaments with a higher melting point than the first group. The fibrous layer according to the invention would comprise than a first group of mono component fibers with a lower melting point and a second group of mono component fibers with a higher melting point whereby at least the fibers with the lower melting point comprise the polysiloxane additive.

The optional further defined solutions for the polysiloxane additive according to the first embodiment can be used for the second alternative embodiment.

All options disclosed for the sheath polymer of the bicomponent filament or fibers are valid also for the mono component fibers of the first group having a lower melting temperature as the second group and forming the binder polymer during consolidation.

All options disclosed for the core polymer of the bicomponent filament or fibers are valid also for the mono component fibers of the second group having a higher melting temperature as the first group, and forming the fibers bound by the binder to form the consolidated fibrous layer according to the invention.

The second group of staple fibers might comprise at least staple fibers of polyester, preferably poly ethylene terephthalate, polyolefin, for instance polypropylene or polyethylene, natural fibers, such as cotton, shoddy cotton or flax, or a mixture thereof.

Preferably the consolidated fibrous layer according to the second alternative embodiment consists of a combination of polyethylene terephthalate (PET) staple fibers and binder fibers formed by a copolymer of polyester containing the additive according to the invention.

The fibrous material according to one of the embodiments according the invention can be moulded as a single layer to form the automotive trim part, like for instance an under body panel, an under engine shield, an outer wheel arch liner or an interior panel, like a parcel shelf, head liner or trunk cladding or panel.

Preferably additional layers can be used on one or both side of the panel to further enhance the functionality of the trim part. For instance one or more of the following layers might be added, a scrim layer, a pervious, optionally perforated, foil or film layer, such as an thermoplastic polyurethane (TPU) or polyester film layer, a porous foam layer, a non-porous foam layer or additional fibrous layer. As foam, polyester foam, melamine foam or polyurethane foam might be used, preferably an open cell foam.

Within the scope of the present invention the AFR or airflow resistance can be measured with an "Airflow Resistance Measurement System" or CARE+ system commercially available from Autoneum Management AG. Alternatively, the AFR is measured according to DIN EN 29053 or DIN 9053 method A. The air flow resistance is a measure or indication for the acoustic performance of the layer or layers measured.

Preferably the consolidated moulded layer according to the invention has an airflow resistance (AFR) in the direction of thickness between 100 to 1500 N·s/m$^3$. Preferably the air flow resistance can be further improved by adding a pervious or perforated film or scrim to obtain an air flow resistance (AFR) at least on one surface of the part before moulding, laminating it during moulding. Preferably the pervious or perforated film is chosen such that an air flow resistance over the part of between 1000 and 5000 N·s/m$^3$ can be achieved.

Preferably the foil or film used comprises perforations at least in sections, preferably with a perforation density of at least 150,000 holes/m$^2$, preferably at least 200,000 holes/m$^2$, preferably not more than 750,000 holes/m$^2$.

The perforation of the film preferably comprises holes with a cross sectional area of which corresponds to essentially cylindrical holes with a diameter between 10 and 1000 µm. By applying a perforated film the sound absorption of the exterior trim part can be further improved.

Preferably the AFR of the moulded trim part consisting of the consolidated fibrous layer according to the invention and the perforated foil layer is between 1,000 and 4,500 N·s/m$^3$, more preferably between 1,500 and 2,500 N·s/m$^3$.

By using the consolidated fibrous layer including the polysiloxane additive at least in the binder polymer, with the binder polymer either in the form of the sheath in a sheath core bicomponent filament or staple fiber or in a mono component binder fiber according to the invention, the additive is available in the melting and binding component and enhances the reduction of the thickness shrinkage during the production of the consolidated trim part. This result in a better final definition of the shape of the trim part produced and a decrease of material needed to obtain the desired thickness. In addition, the reduction of material shrinkage ensures a loftier end product enhancing the acoustic properties of the part.

A felt was made with bicomponent filaments with a coPET sheath and a PET core, with different % of polysiloxane in the sheath. The polysiloxane was added to the master batch before melting, forming and drawing the filaments on a standard melt spinning device. Flat moulded parts were formed in a mould with 6, 7 or 8 mm space between the top and lower mould halve using hot steam moulding. All layers have the same or similar area weight of around 1 kg/m.

The final moulded material samples made had 0%, 0.045%, 0.09%, 0.135% or 0.225% by weight of polysiloxane, based on the final fibrous material.

Figure 1:
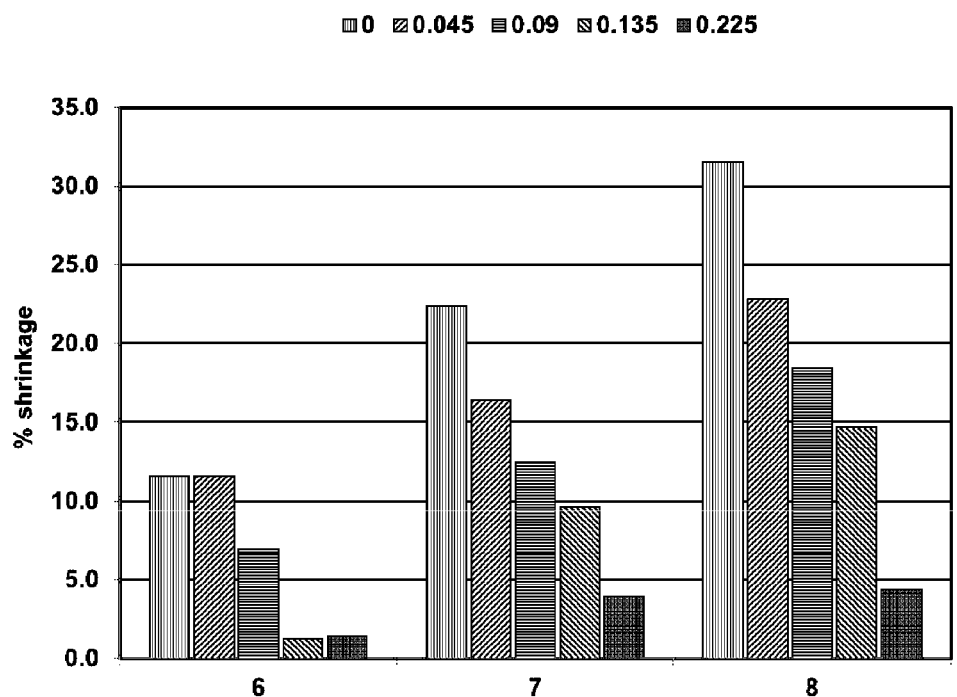
FIG. 1: Graph showing the shrinkage of moulded felt.

The thickness of the consolidated moulded material was measured. FIG. 1 shows a graph of the results, as percentage shrinkage reduction of the achieved thickness vs. the space between the two moulding halves being the wanted thickness. The results show an improvement of the thickness shrinkage at increased levels of polysiloxane.

Figure 2:
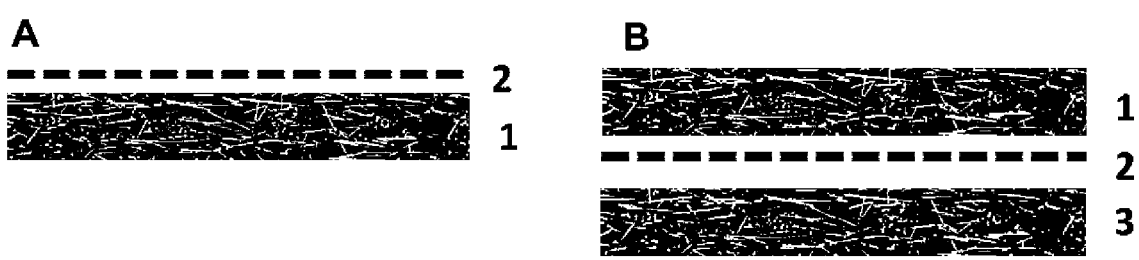
Figure 3:
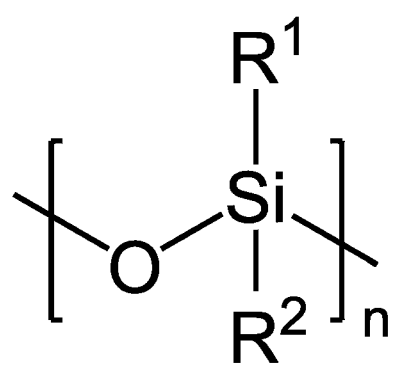

FIG. 2A shows a possible layout for a moulded automotive trim part according to the invention with a consolidated fibrous layer (1) made of bicomponent filaments or staple fibers with at least the sheath of the bicomponent filaments or staple fibers comprising the polysiloxane additive according to the invention. In addition an optional perforated film layer (2) is shown comprising of a perforated coPET film layer laminated together with the consolidated fibrous layer over the surface. Depending on the source of the sound the foil layer is preferably situated between the source and the consolidated fibrous layer.

FIG. 2B shows an alternative example whereby an additional layer for instance a perforated film layer (2) as shown is sandwiched between a consolidated fibrous layer according to one of the solutions and a second layer, that can be either an additional consolidated fibrous layer according to one of the solutions or another fibrous layer. Other layers that can be sandwiched between 2 fibrous layers whereby at least one is a consolidated fibrous layer containing the polysiloxane according to the invention, are at least one of a foam layer either open cell or closed cell, preferably polyester foam, a polyurethane foam or melamine foam.

The invention claimed is:
1. A trim part for a vehicle, comprising:
a fibrous layer comprising thermoplastic bicomponent filaments or staple fibers, wherein the bicomponent filaments or staple fibers consist of a first polymer forming a sheath of the bicomponent filaments or staple fibers and a second polymer forming a core of the bicomponent filaments or staple fibers, and whereby the fibrous layer is consolidated by heating, thereby melting the first polymer forming binding points between the bicomponent filaments or staple fibers; and
wherein at least the first polymer comprises a shrinkage reducing additive being at least a polysiloxane added to the first polymer before forming the bicomponent filaments or staple fibers, wherein the polysiloxane is present within the entirety of the sheath.
2. A trim part for a vehicle, comprising:
a fibrous layer comprising of thermoplastic staple fibers with at least a first group of staple fibers and a second group of staple fibers, whereby the second group of staple fibers has a melting temperature that is higher than the melting temperature of the first group of staple fibers;
whereby the fibrous layer is consolidated by heating, thereby melting the first group of staple fibers forming binding points between the staple fibers of the second group; and
whereby at least the first group of staple fibers comprises a shrinkage reducing additive being a polysiloxane added to the first staple fibers during the formation thereof, wherein the polysiloxane is present within the entirety of the first staple fibers.

3. The trim part of claim 1, whereby the polysiloxane has a molecular weight (Mn) of at least 5000 Dalton.

4. The trim part of claim 1, whereby the silicon content of the polysiloxane by weight is between 10 and 30%.

5. The trim part of claim 1, whereby the polysiloxane has a dispersity index of greater than 2.

6. The trim part of claim 1, whereby the amount of the polysiloxane is in the range of 0.05 and 1% by weight (wt %) of the moulded consolidated fibrous layer.

7. The trim part of claim 1, wherein the second polymer is polyester.

8. The trim part of claim 1, wherein the first polymer is a copolymer of polyester.

9. The trim part of claim 7, whereby the polyester is of virgin origin and/or recycled origin.

10. The trim part of claim 1, whereby the consolidated fibrous layer containing the shrinkage reducing additive has an area weight between 100 and 1700 g·m-2.

11. The trim part of claim 1, where the staple fibers or bicomponent filaments have a diameter in the range of 5 to 30 μm.

12. The trim part of claim 1, further comprising an air pervious or perforated film.

13. The trim part of claim 12, whereby the air flow resistance of the moulded fibrous layer and the perforated film together is between 100 and 5000N·s/m3.

14. The trim part of claim 1, further comprising a foam layer.

15. An automobile, comprising the trim part of claim 1 employed as an under body part, an under engine part or outer wheel arch liner, an engine related trim part, a hush panel, cladding, trunk trim part, an acoustic layer in an inner or outer dash, or in a flooring system.

16. The trim part of claim 12, wherein the air pervious or perforated film is a polyester film, a coPET film, a thermoplastic polyurethane film, a dual layer film, or a scrim.

17. The trim part of claim 2, wherein the second group of staple fibers is polyester.

18. The trim part of claim 17, whereby the polyester is of virgin origin and/or recycled origin.

19. The trim part of claim 2, wherein the first group of staple fibers is a copolymer of polyester.

* * * * *